United States Patent
Hardson et al.

(10) Patent No.: US 7,848,093 B2
(45) Date of Patent: Dec. 7, 2010

(54) DIGITAL VIDEO AND MUSIC PLAYER BELT BUCKLES

(76) Inventors: Winston B. Hardson, 1206 S. Orange Grove Ave., Los Angeles, CA (US) 90029; Mark Bush, 5245 Ladera Crest, Los Angeles, CA (US) 90056

(*) Notice: Subject to any disclaimer, the term of this patent is extended or adjusted under 35 U.S.C. 154(b) by 219 days.

(21) Appl. No.: 11/703,504

(22) Filed: Feb. 6, 2007

(65) Prior Publication Data
US 2008/0024976 A1 Jan. 31, 2008

Related U.S. Application Data

(60) Provisional application No. 60/765,823, filed on Feb. 6, 2006.

(51) Int. Cl.
*G06F 1/16* (2006.01)
(52) U.S. Cl. .......................... 361/679.27; 361/679.03; 361/679.3; 361/679.55; 224/163
(58) Field of Classification Search ......... 361/679–683; 248/917–923
See application file for complete search history.

(56) References Cited

U.S. PATENT DOCUMENTS

| | | | | |
|---|---|---|---|---|
| 4,437,598 A * | 3/1984 | Hull | | 224/163 |
| 4,446,997 A * | 5/1984 | Himberg | | 224/578 |
| 5,005,460 A * | 4/1991 | Suzuki et al. | | 84/600 |
| 5,102,023 A * | 4/1992 | Nguyen | | 224/163 |
| 5,931,764 A * | 8/1999 | Freeman et al. | | 482/4 |
| 5,984,796 A * | 11/1999 | Mah | | 473/215 |
| 6,108,197 A * | 8/2000 | Janik | | 361/683 |
| 6,137,675 A * | 10/2000 | Perkins | | 361/679 |
| 6,182,388 B1 * | 2/2001 | Patton | | 40/640 |
| 6,192,253 B1 * | 2/2001 | Charlier et al. | | 455/575.7 |
| 6,262,889 B1 * | 7/2001 | Newman et al. | | 361/687 |
| 6,359,777 B1 * | 3/2002 | Newman et al. | | 361/679.55 |
| 6,529,372 B1 * | 3/2003 | Ng et al. | | 361/683 |
| 6,564,075 B1 * | 5/2003 | Mitamura | | 455/575.1 |
| 6,597,281 B1 * | 7/2003 | Thomas | | 340/7.63 |
| 6,825,875 B1 * | 11/2004 | Strub et al. | | 348/207.99 |
| 6,886,724 B2 * | 5/2005 | Hung | | 224/163 |
| 6,920,672 B1 * | 7/2005 | Hubbard | | 24/163 K |
| 7,098,813 B1 * | 8/2006 | Hung et al. | | 341/22 |
| 7,158,111 B1 * | 1/2007 | Jackson et al. | | 345/107 |
| 7,221,559 B1 * | 5/2007 | Duarte et al. | | 361/679 |
| D555,328 S * | 11/2007 | Gilbert-Biro et al. | | D2/624 |
| 7,352,567 B2 * | 4/2008 | Hotelling et al. | | 361/679.55 |
| 2002/0024512 A1 * | 2/2002 | Terasawa et al. | | 345/204 |
| 2002/0084904 A1 * | 7/2002 | De La Huerga | | 340/573.1 |
| 2003/0066308 A1 * | 4/2003 | Radley-Smith | | 63/3 |
| 2004/0056958 A1 * | 3/2004 | Lee | | 348/207.1 |

(Continued)

OTHER PUBLICATIONS

PCT International Search Report and Written Opinion for PCT/US 07/03321, mailed Feb. 13, 2008, 8 pages.

*Primary Examiner*—Jayprakash N Gandhi
*Assistant Examiner*—Anthony Q Edwards
(74) *Attorney, Agent, or Firm*—Blakely, Sokoloff, Taylor & Zafman LLP (57) ABSTRACT

Portable devices configured to be worn as a belt buckle are disclosed herein. The portable device includes a housing, a first connector attached to the housing and adapted to slideably receive a belt, and a second connector attached to the housing and adapted to secure the housing to the belt.

14 Claims, 8 Drawing Sheets

U.S. PATENT DOCUMENTS

| | | | |
|---|---|---|---|
| 2005/0012723 A1* | 1/2005 | Pallakoff | 345/173 |
| 2005/0041865 A1* | 2/2005 | Zhen et al. | 382/187 |
| 2005/0104857 A1* | 5/2005 | Jacobs et al. | 345/169 |
| 2005/0107144 A1 | 5/2005 | Dvorak | |
| 2005/0124387 A1* | 6/2005 | Ribeiro et al. | 455/566 |
| 2005/0237704 A1* | 10/2005 | Ceresoli | 361/683 |
| 2006/0005131 A1* | 1/2006 | Tao | 715/702 |
| 2006/0186150 A1* | 8/2006 | Willows et al. | 224/222 |
| 2006/0251283 A1* | 11/2006 | Yeh | 381/388 |
| 2007/0064412 A1* | 3/2007 | Radley-Smith | 362/104 |
| 2007/0137463 A1* | 6/2007 | Lumsden | 84/603 |
| 2007/0149264 A1* | 6/2007 | Hong | 455/575.6 |
| 2007/0150190 A1* | 6/2007 | Riddiford | 701/213 |
| 2007/0159466 A1* | 7/2007 | Kawell et al. | 345/169 |
| 2007/0193003 A1* | 8/2007 | Matusek et al. | 24/163 K |
| 2008/0033733 A1* | 2/2008 | Coates | 705/1 |
| 2008/0108903 A1* | 5/2008 | Ben-Oved et al. | 600/484 |
| 2008/0208627 A1* | 8/2008 | Skyggebjerg | 705/2 |
| 2008/0231935 A1* | 9/2008 | Gally et al. | 359/260 |
| 2009/0143652 A1* | 6/2009 | Warburton et al. | 600/301 |
| 2009/0259969 A1* | 10/2009 | Pallakoff | 715/808 |

* cited by examiner

DIGITAL VIDEO AND MUSIC PLAYER BELT BUCKLES

CROSS-REFERENCE TO RELATED APPLICATIONS

This application claims priority to U.S. Provisional Patent Application No. 60/765,823, filed Feb. 6, 2006, the entirety of which is hereby incorporated by reference.

FIELD

This relates to the field of portable devices and, in particular, to systems and methods for an article of clothing capable of playing audio and video files.

BACKGROUND

Consumers are fundamentally changing the way that they interact with content, as traditional methods of delivery are being rapidly replaced by newer digital technologies that offer customers a much greater degree of freedom and flexibility. This trend has been fueled by the rapid growth of Internet usage by consumers and a number of powerful new technologies for compressing and sharing digital content using a personal computer. Consumers are embracing technologies that allow them to conveniently create, manage and move digital content in an easy and affordable manner.

The growth of consumer Internet connectivity has increased consumer access to digital media. The increase in worldwide broadband connections, together with current and new compression formats and other new technologies, have improved consumers' access to rich digital media. Consumer demand for downloadable content, such as compressed audio files, has given rise to independent music web sites and subscription services.

Portable devices, such as cell phones, mp3 players, personal digital assistants, and the like, are also becoming increasingly common. These portable devices have grown more complex over time, incorporating a myriad of features, including, for example, mp3 player capabilities, web browsing capabilities, capabilities of personal digital assistants (PDAs) and the like.

These portable devices are often placed into a user's pocket or purse when not in use, and are held by the user, in their hand, when they are in use.

BRIEF DESCRIPTION OF THE DRAWINGS

The invention is described by way of example with reference to the accompanying drawings, wherein.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to not unnecessarily obscure the embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
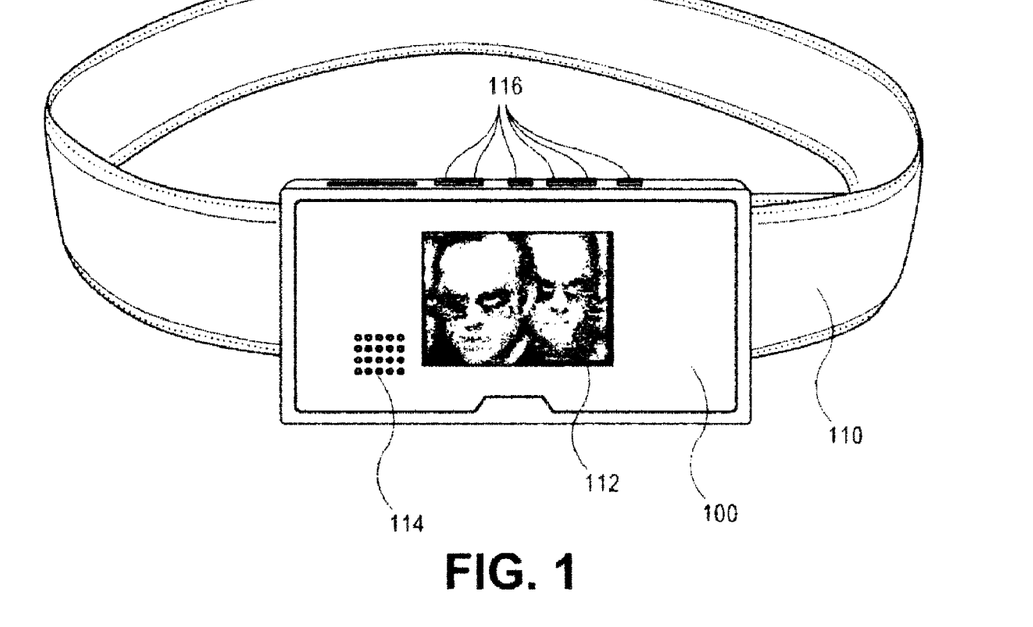
FIG. 1 is a perspective view of a portable device in accordance with one embodiment of the invention.

FIG. 1, of the accompanying figures, shows a portable device 100 in accordance with one embodiment of the invention. The portable device 100 is shown connected to a belt 110.

The portable device 100 includes a display screen 112. The portable device 100 optionally includes a speaker 114. The portable device 100 also includes controls 116. The portable device 100 also includes features (not shown) which allow the portable device 100 to be secured to the belt 110.

The belt 110 may be a conventional belt to which the portable device 100 is secured. In one embodiment, the portable device 100 is secured over a belt buckle (not shown) of a conventional belt. Alternatively, the belt 100 may be a belt configured to have a belt buckle which is the portable device 100.

Figure 8A:
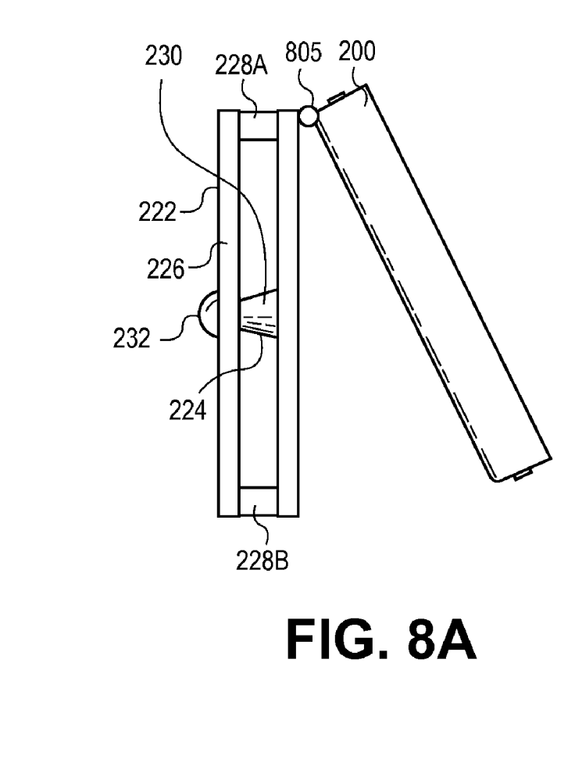
FIG. 8a is a side view of the portable device in accordance with another embodiment of the invention.
Figure 8B:
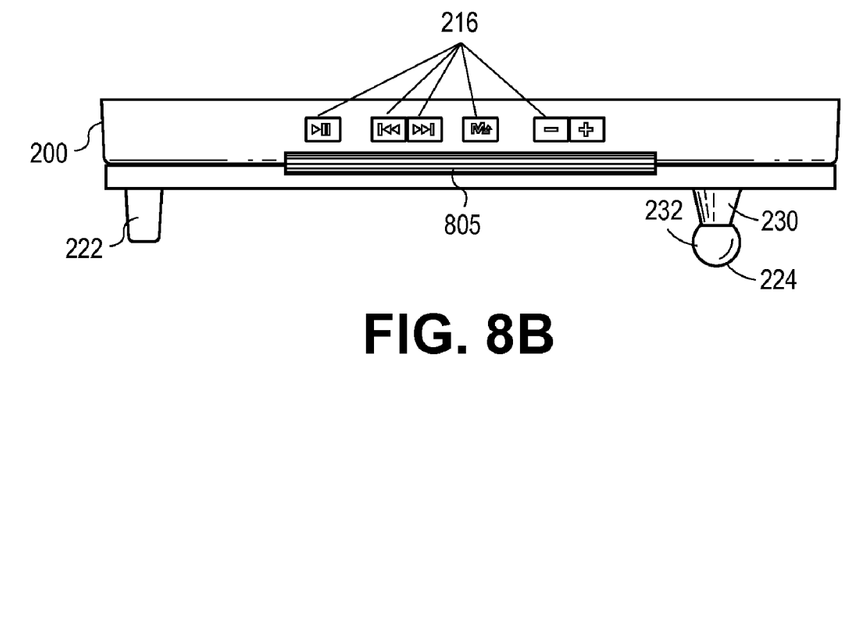
FIG. 8b is a top view of the portable device in accordance with another embodiment of the invention.

As shown in FIG. 1, the portable device 100 is secured to the belt 110, such that the display screen is viewable by people looking at the person wearing the belt. Alternatively, the portable device 100 may include a hinge 805, as illustrated in FIGS. 8A and 8B, and related software, such that the portable device 100 can be both viewed by people looking at the person wearing the belt 110 and the person actually wearing the belt 110. Alternatively, the portable device may include a hinge 805 such that the portable device 100 is viewable by the person wearing the belt 110.

In one embodiment, the portable device 100 can automatically determine the configuration of the portable device 100 and display images accordingly. Alternatively, user input may be required to adjust the image display in accordance with the configuration of the portable device 100.

In one embodiment, the portable device 100 may be removably secured to the belt 110. For example, the portable device 100 may be configured to be removed from the belt 110, such that the user can hold the portable device 100 in their hand, separate from the belt 110.

Figure 2:
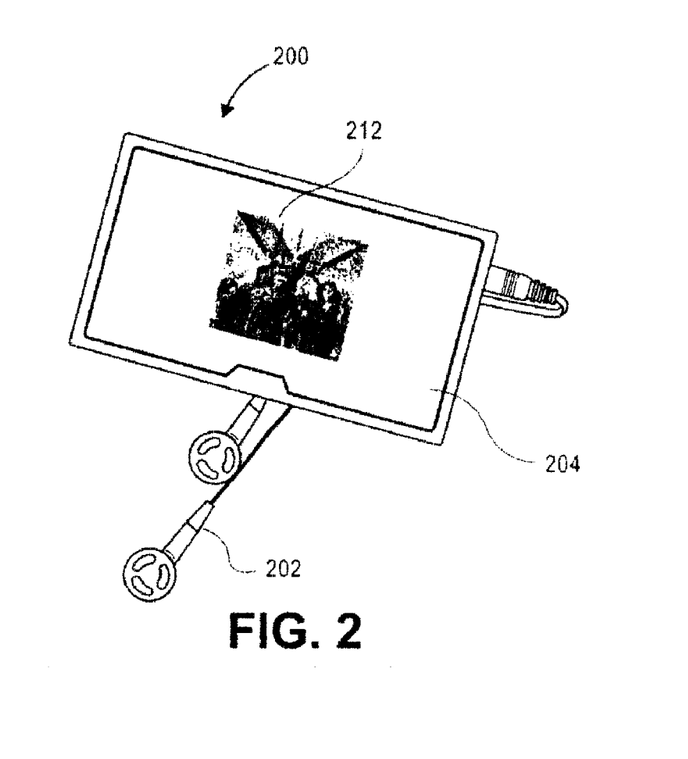
FIG. 2 is a perspective view of a portable device in accordance with one embodiment of the invention.

FIG. 2 shows a portable device 200 in accordance with one embodiment of the invention. The portable device 100 may be the portable device 200. The portable device 200 is shown with headphones 202, attached thereto. The portable device 200 includes a housing 204. The housing 204 includes a display device 212.

The portable device 200 may be wireless. In an embodiment in which the portable device 200 is wireless, the portable device 200 may include an antenna and/or other components needed to make the portable device 200 wireless, as known to those of skill in the art.

The portable device 200 also includes a data processing system (not shown) therein. The data processing system may include memory, capable of storing data. In one embodiment, the memory may include audio or digital files, and the data processing system, based on user input, may display the digital files on the display device 212 and/or play the audio files on the speaker 214 or through the headphones 202. It will be appreciated that the memory may store additional types of files or files in differing formats. It will also be appreciated that the data processing system may be capable of performing additional functions.

Figures 3A, 3B, 3C, 3D, 3E:
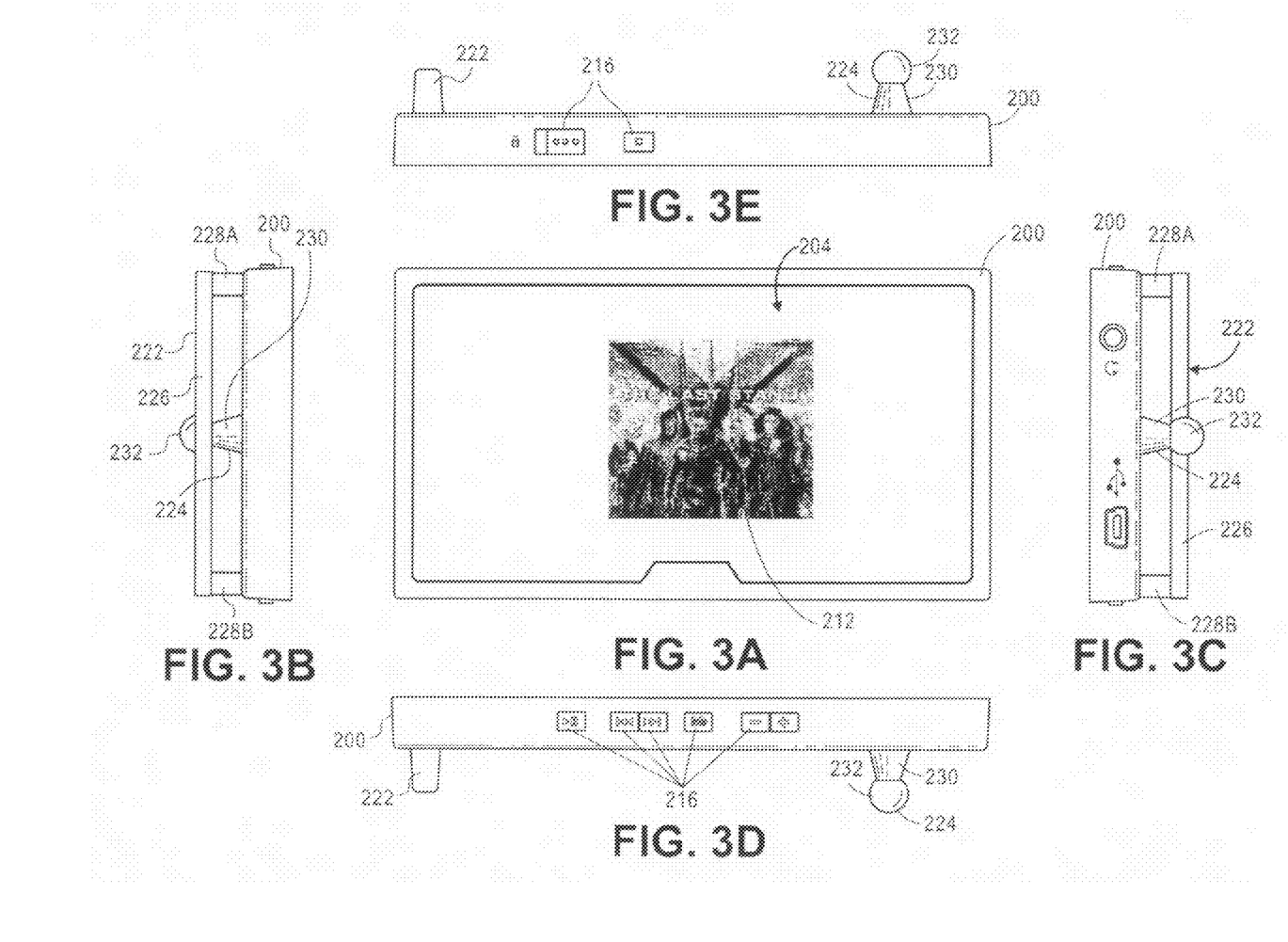
FIG. 3a is a front view of the portable device of FIG. 2 in accordance with one embodiment of the invention.
FIG. 3b is a side view of the portable device of FIG. 2 in accordance with one embodiment of the invention.
FIG. 3c is an opposing side view of the portable device of FIG. 2 in accordance with one embodiment of the invention.
FIG. 3d is a top view of the portable device of FIG. 2 in accordance with one embodiment of the invention.
FIG. 3e is a bottom view of the portable device of FIG. 2 in accordance with one embodiment of the invention.

FIG. 3A is a front view of the portable device 200. As shown in FIG. 3A, the portable device 200 includes the display device 212. It will be appreciated that the display device 212 may be smaller or larger than the illustrated display device 212. The display device 212 may take up substantially all of the front surface of the housing 204. The display device 212 may be, for example, a display screen, a touch screen, and the like.

FIG. 3B is a side view of the portable device 200. The portable device 200 is shown having a first connecting member 222 and a second connecting member 224.

The first connecting member 222 is illustrated as a bar 226 having two extensions 228a, 228b. The extensions 228a, 228b connect the bar 226 with the housing 204 of the portable device 200. The first connecting member 222 forms a loop, which is adapted to slideably receive a belt.

The second connecting member 224 has a pin-shape adapted to fit within a belt hole. The illustrated second connecting member 224 includes a shaft 230 and a ball 232 connecting to an end of the shaft. The ball 232 is sized to fit within the belt hole, and extend though to an inner surface of the belt to secure the portable device 200 to the belt with the belt hole.

FIG. 3C is an opposing side view showing the first connecting member 222 and second connecting member 224 from a different view. It will be appreciated that the first and second connecting members 222, 224 may be reversed, relative to one another.

FIG. 3C also shows the housing including a port for receiving the headphones and a USB port. It will be appreciated that the positioning of these features does not necessarily need to be on a side surface of the portable device 200. For example, the features may be positioned on the front surface, top surface, bottom surface, opposing side surface or back surface of the portable device 200.

FIG. 3D is a top view of the portable device 200 and FIG. 3E is a bottom view of the portable device 200. The top surface and the bottom surface of the portable device 200 are shown including controls 216. The controls 216 may be, for example, buttons, switches, dials, sliders, keys or keypad, navigation pad, touch pad, touch screen, and the like.

It will be appreciated that the positioning of the controls 216 does not necessarily need to be on a side surface of the portable device 200. For example, the features may be positioned on the front surface, top surface, bottom surface, opposing side surface or back surface of the portable device 200.

Figure 3F:
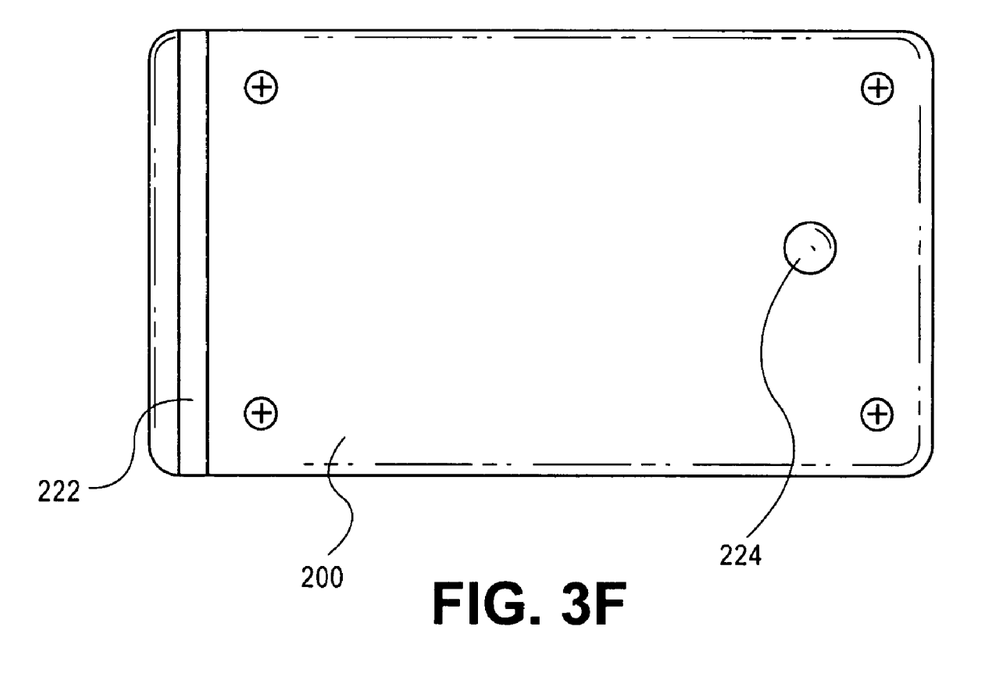
FIG. 3f is a back view of the portable device of FIG. 2 in accordance with one embodiment of the invention.

FIG. 3F is a rear view of the portable device 200, further illustrating the connecting members 222, 224 of the portable device 200.

Figure 4:
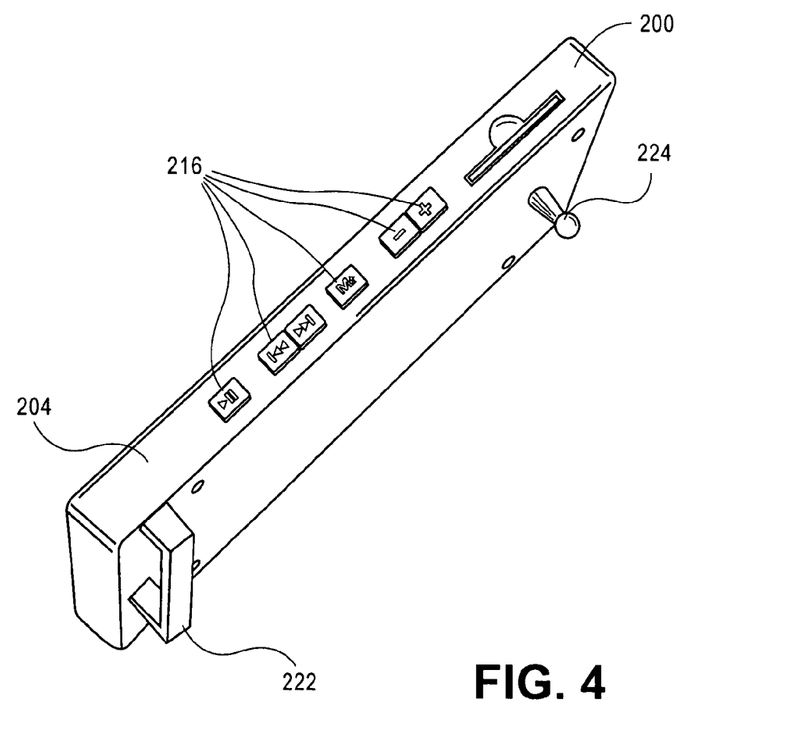
FIG. 4 is a back perspective view of a portable device in accordance with one embodiment of the invention.

FIG. 4 shows the top surface and back of portable device 200, further illustrating the controls 216 and connecting members 222, 224 of the portable device 200.

Figure 5:
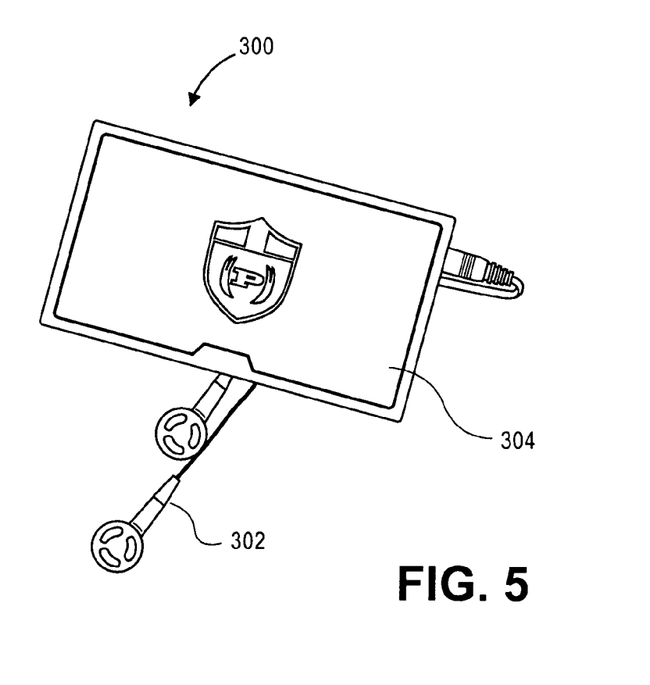
FIG. 5 is a perspective view of a portable device in accordance with one embodiment of the invention.

FIG. 5 shows a portable device 300 in accordance with one embodiment of the invention. The portable device 100 may be the portable device 300.

The portable device 300 is shown with headphones 302, attached thereto. The portable device 300 includes a housing 304.

The portable device 300 may be wireless. In an embodiment in which the portable device 300 is wireless, the portable device 300 may include an antenna and/or other components needed to make the portable device 300 wireless, as known to those of skill in the art.

The portable device 300 also includes a data processing system (not shown) therein. The data processing system may include memory, capable of storing data. In one embodiment, the memory may include audio files, and the data processing system, based on user input, may play the audio files on the speaker 314 or through the headphones 302. It will be appreciated that the memory may store additional types of files or files in differing formats. It will also be appreciated that the data processing system may be capable of performing additional functions.

Figure 6A:
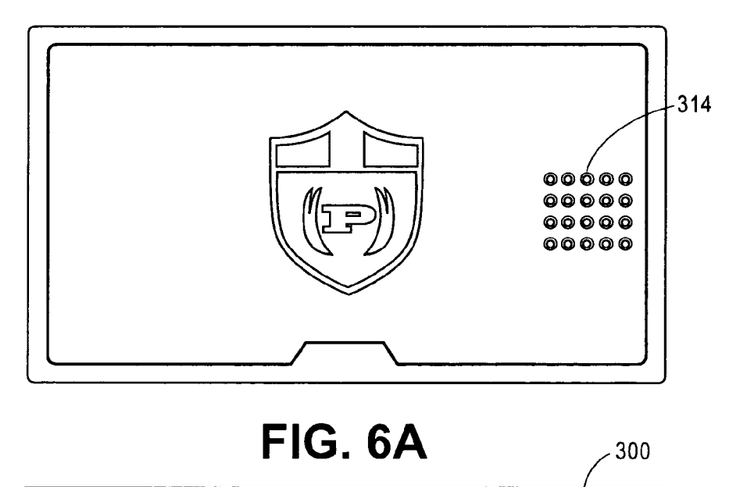
FIG. 6a is a front view of the portable device of FIG. 5 in accordance with one embodiment of the invention.

FIG. 6A is a front view of the portable device 300. As shown in FIG. 6A, the portable device 300 includes a speaker 314. Any speaker, as known to those of skill in the art, for use with portable devices may be used.

Figure 6B:
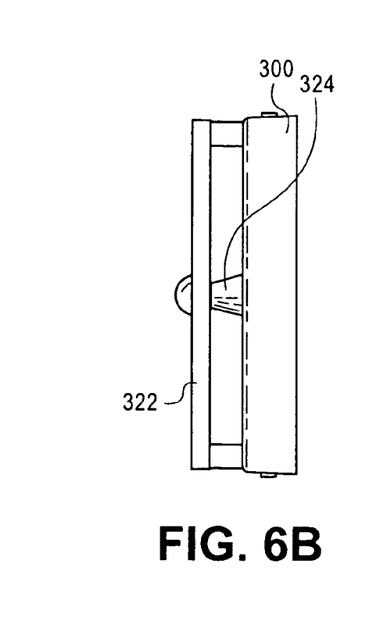
FIG. 6b is a side view of the portable device of FIG. 5 in accordance with one embodiment of the invention.

FIG. 6B is a side view of the portable device 300. The portable device 300 is shown having a first connecting member 322 and a second connecting member 324.

The first connecting member 322 is illustrated as a bar 326 having two extensions 328a, 328b. The extensions 328a, 328b connect the bar 326 with the housing 304 of the portable device 300. The first connecting member 322 forms a loop, which is adapted to slideably receive a belt.

The second connecting member 324 has a pin-shape adapted to fit within a belt hole. The illustrated second connecting member 324 includes a shaft 330 and a ball 332 connecting to an end of the shaft. The ball 332 is sized to fit within the belt hole, and extend though to an inner surface of the belt to secure the portable device 300 to the belt with the belt hole.

Figure 6C:
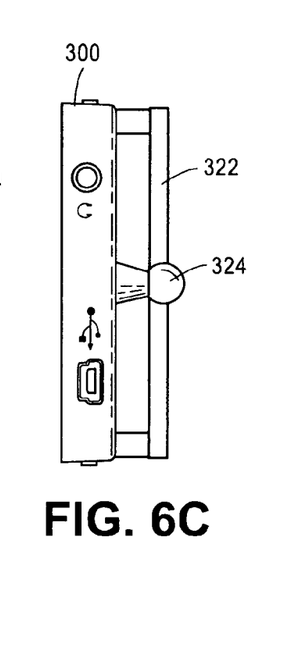
FIG. 6c is an opposing side view of the portable device of FIG. 5 in accordance with one embodiment of the invention.

FIG. 6C is an opposing side view showing the first connecting member 322 and second connecting member 324 from a different view. It will be appreciated that the first and second connecting members 322, 324 may be reversed, relative to one another.

FIG. 6C also shows the housing including a port for receiving the headphones and a USB port. It will be appreciated that the positioning of these features does not necessarily need to be on a side surface of the portable device 300. For example, the features may be positioned on the front surface, top surface, bottom surface, opposing side surface or back surface of the portable device 300.

Figure 6D:
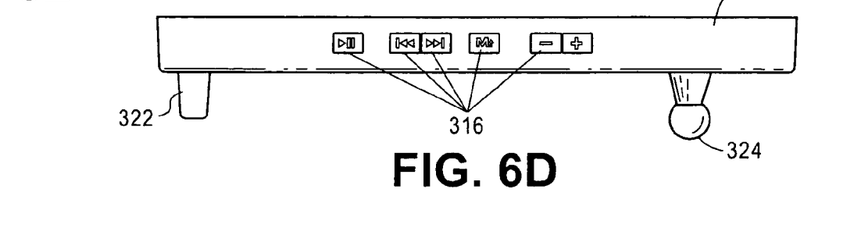
FIG. 6d is a top view of the portable device of FIG. 5 in accordance with one embodiment of the invention.
Figure 6E:
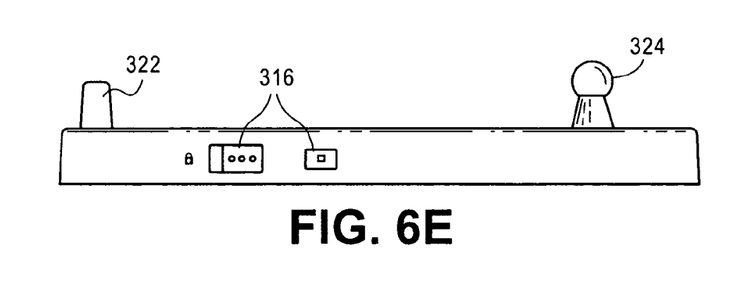
FIG. 6e is a bottom view of the portable device of FIG. 5 in accordance with one embodiment of the invention.

FIG. 6D is a top view of the portable device 300 and FIG. 6E is a bottom view of the portable device 300. The top surface and the bottom surface of the portable device 300 are shown including controls 316. The controls 316 may be, for example, buttons, switches, dials, sliders, keys or keypad, navigation pad, touch pad, touch screen, and the like.

It will be appreciated that the positioning of the controls 316 does not necessarily need to be on a side surface of the portable device 300. For example, the features may be positioned on the front surface, top surface, bottom surface, opposing side surface or back surface of the portable device 300.

Figure 6F:
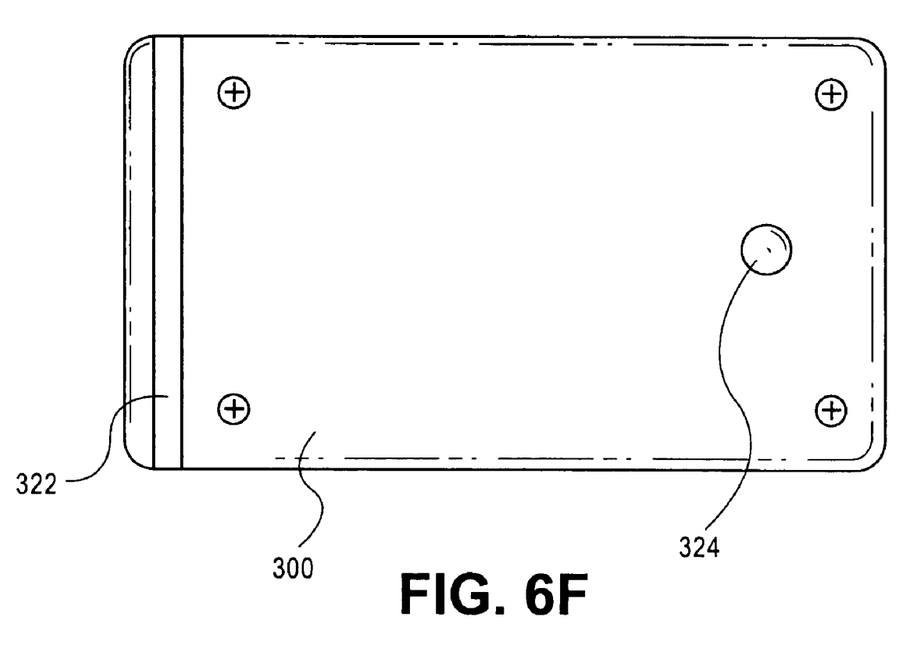
FIG. 6f is a back view of the portable device of FIG. 5 in accordance with one embodiment of the invention.

FIG. 6F is a rear view of the portable device 300, further illustrating the connecting members 322, 324 of the portable device 300.

Figure 7:
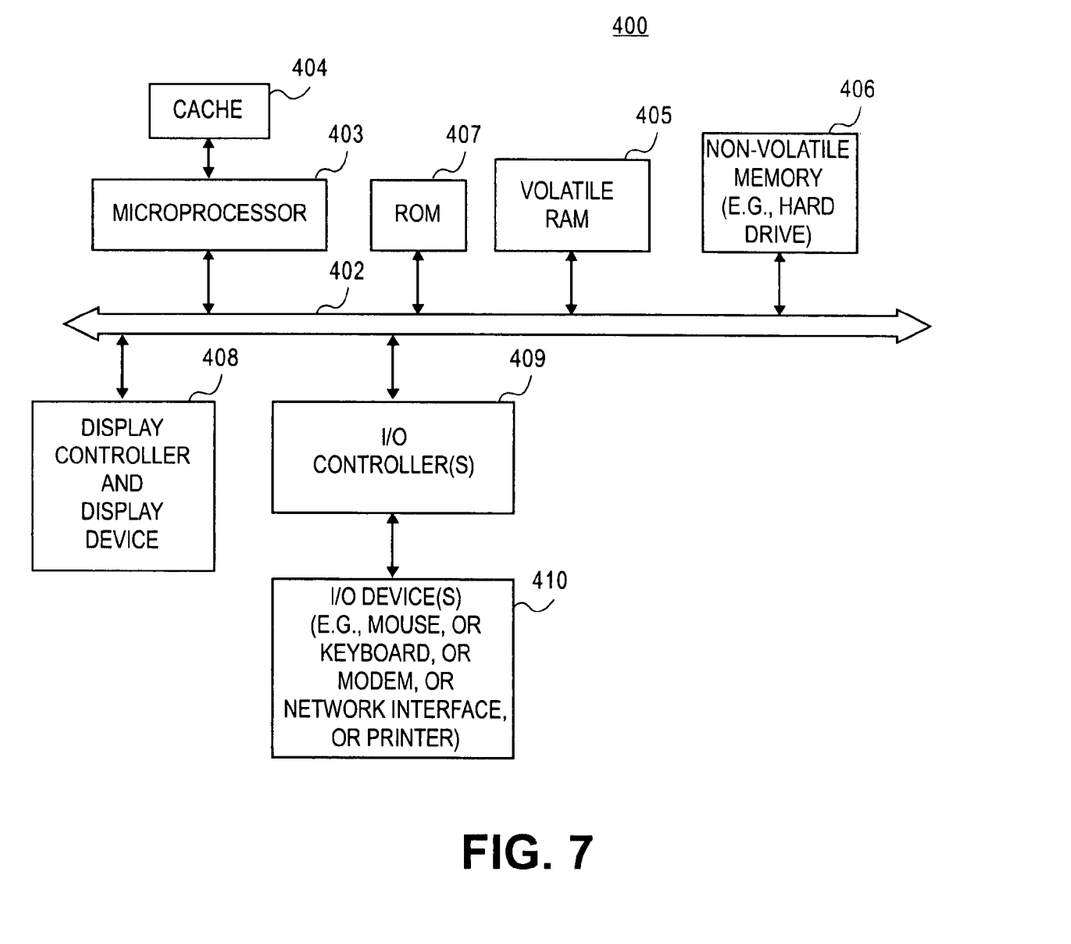
FIG. 7 is a block diagram of a digital processing system in accordance with one embodiment of the present invention.

Note, that while FIG. 7 illustrates various components of a data processing system, it is not intended to represent any particular architecture or manner of interconnecting the components, as such details are not germane to the present invention. It will also be appreciated that network computers, handheld computers, cell phones, multimedia players, and other data processing systems which have fewer components or perhaps more components may also be used with the present invention.

As shown in FIG. 7, the processing system 400 includes a bus 402 which is coupled to a microprocessor 403 and a ROM 407, a volatile RAM 405, and a non-volatile memory 406. The microprocessor 403, which may be, for example, a PowerPC G4 or PowerPC G5 microprocessor from Motorola, Inc. or IBM, is coupled to cache memory 404 as shown in the example of FIG. 7. The bus 402 interconnects these various components together and also interconnects these components 403, 407, 405 and 406 to a display controller and display device 408, as well as to input/output (I/O) devices 410. Typically, the I/O devices 410 are coupled to the system through I/O controllers 409. The volatile RAM 405 is typically implemented as dynamic RAM (DRAM) which requires power continuously in order to refresh or maintain the data in the memory. The non-volatile memory 406 is typically a magnetic hard drive, a magnetic optical drive, an optical drive, or other type of memory system which maintains data even after power is removed from the system. Typically, the non-volatile memory will also be a random access memory, although this is not required. While FIG. 7 shows the non-volatile memory is a local device coupled directly to the rest of the components in the processing system, it will be appreciated that the present invention may utilize a non-volatile memory which is remote from the system, such as a network storage device which is coupled to the data processing system through a network interface. The bus 402 may include one or more buses connected to each other through various bridges, controllers and/or adapters, as is well-known in the art. In one embodiment, the I/O controller 409 includes a USB (Universal Serial Bus) adapter for controlling USB peripherals. Alternatively, I/O controller 409 may include an IEEE-1394 adapter, also known as FireWire adapter, for controlling FireWire devices. Other components may be included.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system comprising:
   a belt; and
   a portable device connected to the belt, the portable device including a display screen, a hinge, a speaker, and a data processing system,
   wherein a first surface of the portable device is connected to the belt and a hinge, and a second surface of the portable device is connected to the hinge and includes the display screen, the second surface being rotatable relative to the first surface such that the display screen is viewable to a user when wearing the belt, and
   wherein the data processing system determines an orientation of the portable device relative to a viewer of the display screen and displays images on the display screen according to the orientation.

2. The system of claim 1, wherein the portable device comprises a housing and a connector attached to the housing, the connector adapted to connect the housing to the belt.

3. The system of claim 1, wherein the portable device comprises a port adapted to receive headphones.

4. The system of claim 1, wherein the data processing system displays video files on the display screen.

5. The system of claim 1, wherein the data processing system plays files over the speaker.

6. The system of claim 2, wherein the connector comprises a first connector and a second connector, the first connector adapted to slideably receive a belt and the second connector adapted to secure the housing to the belt.

7. The system of claim 1, wherein the portable device is hingeably connected to the belt.

8. An apparatus comprising:
   a housing including a data processing system, a speaker, a display screen, and a hinge, wherein the data processing system determines an orientation of the display screen relative to a viewer of the display screen and displays images on the display screen according to the orientation; and
   a connector attached to the housing, the connector adapted to connect the housing to a belt, wherein a first surface of the housing is connected to the connector and the hinge, and a second surface is connected to the hinge and includes the display screen, the second surface being rotatable relative to the first surface such that the display screen is viewable to a user when wearing the belt.

9. The apparatus of claim 8, wherein the housing comprises a port adapted to receive headphones.

10. The apparatus of claim 8, wherein the data processing system is capable of displaying video files on the display screen.

11. The apparatus of claim 8, wherein the data processing system is capable of playing audio files over the speaker.

12. The apparatus of claim 8, wherein the connector comprises a first connector and a second connector, the first connector adapted to slideably receive a belt and the second connector adapted to secure the housing to the belt.

13. A system comprising:
   a housing adapted to receive a portable device, the portable device including a data processing system, a speaker, and a display screen, wherein the data processing system determines an orientation of the display screen relative to a viewer of the display screen and displays images on the display screen according to the orientation;
   a first connector attached to the housing and adapted to slideably receive a belt; and
   a second connector attached to the housing and adapted to secure the housing to the belt, wherein a first surface of the housing is connected to the second connector and a hinge, and a second surface is connected to the hinge and includes the display screen, the second surface being rotatable relative to the first surface such that the display screen is viewable to a user when wearing the belt.

14. The system of claim 13, wherein the portable device is removable from the housing.

* * * * *